(12) United States Patent
Wishart et al.

(10) Patent No.: US 7,463,137 B2
(45) Date of Patent: Dec. 9, 2008

(54) APPARATUS, SYSTEM, AND METHOD FOR BACK UP CONTROL OF A TOWED VEHICLE

(76) Inventors: Randell J. Wishart, 316 California Ave., #324, Reno, NV (US) 89509; Jesse T. Wilkinson, P.O. Box 631213, Littleton, CO (US) 80163; Robin Lee Benjamin, 945 Pinebrook Rd., Reno, NV (US) 89509

( * ) Notice: Subject to any disclaimer, the term of this patent is extended or adjusted under 35 U.S.C. 154(b) by 42 days.

(21) Appl. No.: 11/741,660

(22) Filed: Apr. 27, 2007

(65) Prior Publication Data

US 2007/0252359 A1 Nov. 1, 2007

(51) Int. Cl.
  *G08B 21/00* (2006.01)
  *B60K 28/10* (2006.01)
(52) U.S. Cl. .......... 340/431; 340/425.5; 180/271; 180/280
(58) Field of Classification Search .......... 340/431, 340/425.5, 687, 426.31; 307/9.1, 10.8; 280/477, 280/475, 292, 493, 511, 209; 180/271, 274, 180/280, 281
See application file for complete search history.

(56) References Cited

U.S. PATENT DOCUMENTS

| | | | | |
|---|---|---|---|---|
| 3,947,839 A | * | 3/1976 | Zigmant | 340/431 |
| 5,108,123 A | * | 4/1992 | Rubenzik | 340/431 |
| 6,446,998 B1 | * | 9/2002 | Koenig et al. | 340/431 |
| 6,827,363 B1 | * | 12/2004 | Amerson | 280/477 |
| 7,154,385 B2 | * | 12/2006 | Lee et al. | 340/431 |
| 7,164,350 B2 | * | 1/2007 | Ferrone et al. | 340/463 |
| 7,207,588 B2 | * | 4/2007 | Bergum et al. | 340/431 |
| 2004/0017285 A1 | * | 1/2004 | Zielinski et al. | 340/431 |
| 2004/0178329 A1 | * | 9/2004 | Kare et al. | 250/227.11 |
| 2006/0232043 A1 | * | 10/2006 | Inoue et al. | 280/515 |

* cited by examiner

*Primary Examiner*—George A Bugg
*Assistant Examiner*—Eric M Blount
(74) *Attorney, Agent, or Firm*—Holland & Hart LLP

(57) ABSTRACT

A system and method are disclosed for back up control of a towed-vehicle. The system may include a back up detector, at least one misalignment sensor, a controller, and a misalignment responder. The misalignment responder turns the steering wheel of a towed-vehicle. The system may further include a wireless transmitter to communicate signals between a towing-vehicle and the towed-vehicle. A misalignment signal may be produced by the misalignment sensor when a relative angle between the towing-vehicle and the towed-vehicle exceeds a relative angle threshold. The system may further include a monitoring device in the towing-vehicle to provide an indication of jackknifing and that a towed-vehicle's battery power is low.

26 Claims, 7 Drawing Sheets

APPARATUS, SYSTEM, AND METHOD FOR BACK UP CONTROL OF A TOWED VEHICLE

BACKGROUND OF THE INVENTION

1. Field of the Invention

This invention relates to systems for back up control of a towed-vehicle and more particularly relates to controlling the pivot of a towed-vehicle's wheels.

2. Description of the Related Art

Presently there are several established methods of towing a motor vehicle. One method includes anchoring the motor vehicle to the top of a trailer and towing the trailer. For many common towing applications, such as towing a motor vehicle behind a motor home, the trailer method of towing a motor vehicle may not be practical due to the initial cost of purchasing the trailer, the trailer storage requirements, and the added weight of the trailer while towing. Additionally, the cost of maintaining the trailer to ensure safe operation may be prohibitively high. Because of the added weight of the trailer a more powerful and expensive towing vehicle may be required, and further costs may be incurred due to a decrease in fuel efficiency of the towing-vehicle.

Another method of towing a motor vehicle includes placing a tow dolly under the front wheels of the motor vehicle. While the tow dolly method may marginally decrease the costs and inconveniences of the trailer method, it doesn't eliminate them. For example, tow dollies may be expensive, heavy, inconvenient to store, and require maintenance. Another challenge of tow dollies is that great care must be taken when joining the tow dolly to the towing-vehicle and securing the towed-vehicle to the dolly. Failure to properly secure the towed-vehicle may result in severe safety and property issues. A properly secured towed-vehicle and tow dolly still provides driving and safety challenges to the driver of the towing-vehicle as the dolly may feel unstable while driving and be very difficult to back up.

A popular method for common motor vehicle towing applications is the tow bar. In contrast to trailers and tow dollies, tow bars are relatively inexpensive, easy to install, easy to store, and require little maintenance. The chief drawback of the tow bar is the inability of the towing vehicle to back up while towing without jackknifing with the towed-vehicle. Presently, if back up of the towing-vehicle using the tow bar is required then the towed-vehicle and the tow bar assembly must be removed, the towed-vehicle backed up separately, the towing-vehicle moved to the desired position, and then the towing vehicle and the tow bar assembly must be reconnected.

SUMMARY OF THE INVENTION

From the foregoing discussion, it should be apparent that a need exists for an apparatus, system, and method that provides back up control for a towed-vehicle using a tow bar. Beneficially, such an apparatus, system, and method would allow for the controlled turning of the towed-vehicle's wheels while backing up such that a lateral dragging of the towed-vehicle's wheels and the jackknifing of a towing-vehicle with the towed-vehicle is prevented.

The present invention has been developed in response to the present state of the art, and in particular, in response to the problems and needs in the art that have not yet been fully solved by currently available towing methods. Accordingly, the present invention has been developed to provide an apparatus, system, and method for back up control that overcome many or all of the above-discussed shortcomings in the art.

A method is disclosed for back up control of a towed-vehicle. The method includes providing a back up detector that generates a back up signal indicating that a towing vehicle is backing up. The method includes providing a misalignment detector that generates a misalignment signal indicating that a towed-vehicle is misaligned. The method further includes providing a controller that generates a turn mode signal based on the back up signal and the misalignment signal. A misalignment responder is further provided that turns a steering wheel of the towed-vehicle based on the turn mode signal.

The back up detector may be a wire electrically coupled to the towing vehicle's back up lights. The misalignment detector may be a magnetic sensor, an electromagnetic field sensor, an infrared sensor, an optical sensor, an ultrasonic sensor, and/or a mechanical switch. A monitoring device may be further included providing an indication that the towed-vehicle's battery power is low and/or that the towed-vehicle and a towing-vehicle are misaligned. The misalignment responder may comprise an extendable stabilizer, at least three couplers, an attachable anchor, a power connector, a receiver, and a rotary actuator.

An operation is disclosed to control back up of a towed-vehicle. The operation may include interpreting the back up signal, interpreting the misalignment signal, and producing a turn mode signal. Producing the turn mode signal may include determining whether a relative angle between the towing-vehicle and the towed-vehicle is exceeding a relative angle threshold. Based on the direction of the relative angle threshold being exceeded a direction to turn the towed-vehicle's wheels may be determined.

A system is disclosed for back up control of a towed-vehicle. The system may include a back up detector producing a back up signal indicating that a towing-vehicle is backing up. The system may include at least one misalignment sensor producing a misalignment signal indicating that a towed-vehicle is misaligned. A controller for interpreting the back up signal and the misalignment signal may be provided. The controller may be configured to produce a turn mode signal based on the back up signal and the misalignment signal. The system further includes a misalignment responder coupled to the steering wheel of a towed-vehicle. The misalignment responder may turn the steering wheel of a towed-vehicle based on the turn mode signal.

The system may include a wireless transmitter that receives the turn mode signal and transmits the turn mode signal to the misalignment responder. The misalignment responder may receive power through an accessory power port in the towed-vehicle. In other contemplated embodiments the power is provided from either the towing vehicle and/or towed vehicle and may include a 12-volt source, a 24-volt source, and a 42-volt source. The misalignment responder may consist of a rotary actuator. The rotary actuator may comprise a worm gear interfacing with a ring gear for mechanical advantage at low power. The rotary actuator may shut down when a stall of the rotary actuator is detected. The system may include a monitoring device to alert a user when a towed-vehicle's battery power is low, and/or that the towing-vehicle and the towed-vehicle may be jackknifing. The monitoring device may be a monitor screen, light, and/or sound producing device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
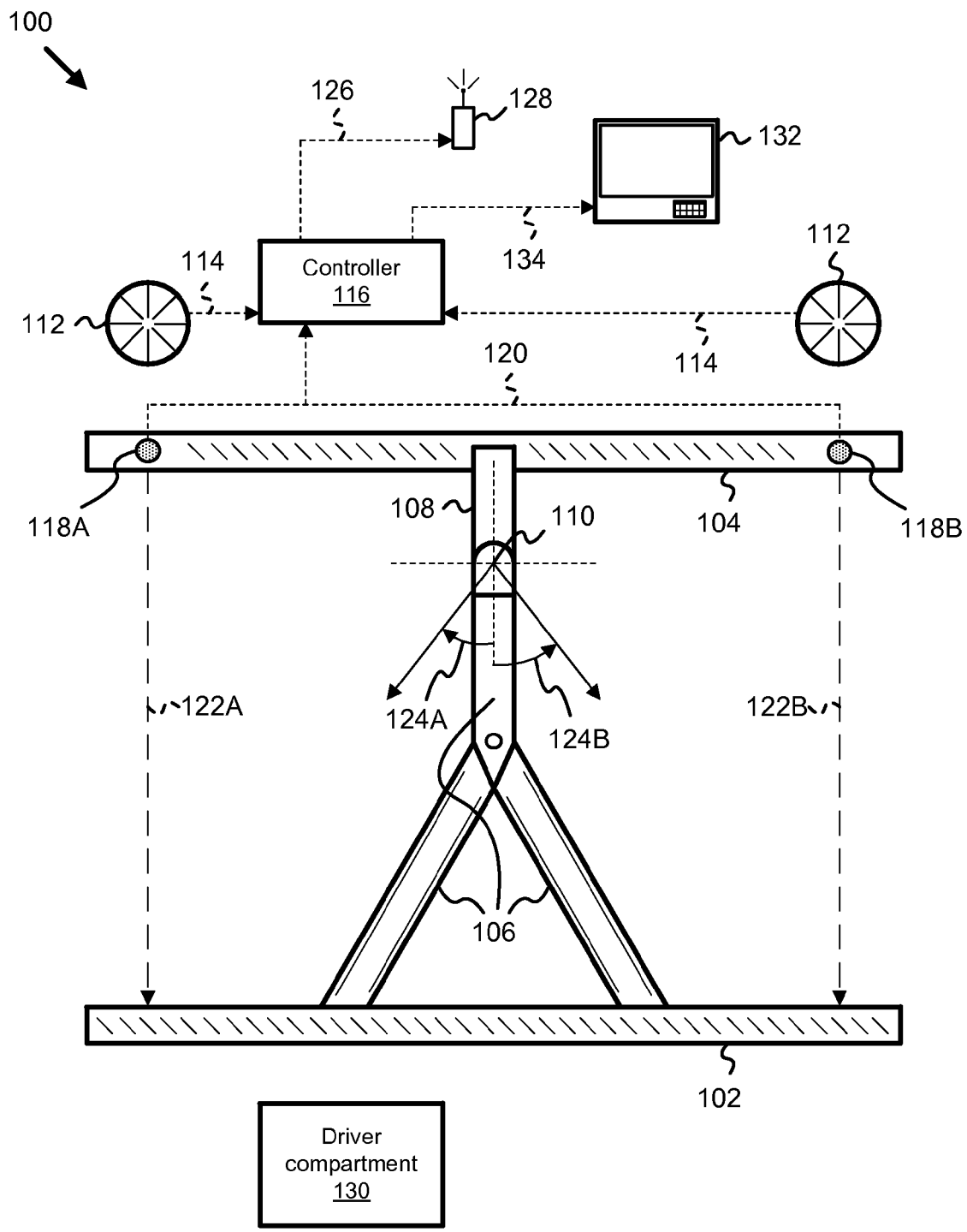
FIG. 1 is an illustration depicting one embodiment of a system for back up control of a towed-vehicle in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is an illustration depicting one embodiment of a system 100 for back up control of a towed-vehicle in accordance with the present invention. The system 100 comprises a towed-vehicle bumper 102, a towing-vehicle bumper 104, a tow bar 106, a tow hitch 108, and a pivot point 110. The tow bar 106 may comprise two arms fastened to a base plate (not shown) on the front of the towed-vehicle. The tow bar 106 may be coupled to the towing vehicle at the pivot point 110 where a tow ball (not shown) serves to connect the tow bar 106 to the towing-vehicle such that transverse pivotal movement of the towed-vehicle is allowed during transit.

The system 100 may include a wiring harness (not shown) to provide brake light signals from the towing-vehicle to the towed-vehicle such that when a towing-vehicle's brakes are engaged the brake lights of the towed-vehicle are on. In one embodiment of the system 100 the wiring harness may further include a power cord connecting a power supply to a battery of the towed-vehicle. The power supply may provide a charge to the battery. The system 100 may further include back up lights 112. In one embodiment, the back up lights 112 comprise a back up detector 112 providing a back up signal 114 that is electronically communicated to a controller 116 via a wire. In an alternate embodiment the back up detector 112 may comprise an indication that a towing-vehicle is in a reverse gear. For example, the controller 116 may interpret a signal 114 from a data network of the towing- vehicle. The back-up signal 114 may permit the activation of a misalignment responder.

The system 100 further comprises at least one misalignment detector 118 providing a misalignment signal 120 to the controller 116. In one embodiment the at least one misalignment detector 118 may comprise two ultrasonic sensors 118A and 118B to detect corresponding distances 122A and 122B. The controller 116 may determine a relative angle 124A or 124B based on the distances 122A and 122B. The relative angle 124 may comprise an angle 124 formed by an absolute deviation from parallel of an axis along the length of the towed-vehicle compared to an axis along the length of the owing-vehicle.

The direction of the relative angle 124A or 124B indicates a direction for the misalignment signal. Should the magnitude of the relative angle 124 exceed a certain threshold angle then a misalignment signal 120 may be produced. For example, when a tow bar 106 veers to a threshold angle 124A a misalignment signal 120 may be produced. The misalignment signal 120 may allow the towed-vehicle to track the towing-vehicle as if the towed-vehicle were a trailer with fixed wheels. In one embodiment the misalignment signal 120 may indicate that a left turn of the steering wheel of the towed-vehicle is required to realign the towed-vehicle such that a jackknife is avoided. In one embodiment the steering wheel of the towed-vehicle may turn until the straight neutral position is reached. The magnitude of the relative angle threshold may be about 25 to 35 degrees from parallel.

In alternate embodiments the misalignment detector 118 may comprise at least on device selected from the group consisting of a magnetic sensor, an electromagnetic field sensor, an infrared sensor, an optical sensor, and a mechanical switch. In one example, a mechanical switch may be placed on either side of the pivot point 110 such that when the tow bar 106 and the tow hitch 108 pivot to a certain relative angle 124 one of the mechanical switches is mechanically depressed by the action of the pivot, generating the misalignment signal 120.

The controller 116 may comprise modules configured to interpret the misalignment signal 120 and the back up signal 114. The controller 116 may generate a turn mode signal 126 based on the misalignment signal 120 and the back up signal 114. In one embodiment the turn mode signal 126 is sent to a wireless transmitter 128 that wirelessly transmits the turn mode signal 126 to a misalignment responder in the driver compartment 130. In an alternate embodiment the turn mode signal 126 is transmitted over a wire to the receiver. The controller 116 may comprises a back up module, a misalignment module, and a turn mode module.

The system 100 may further comprise a monitoring device 132 to provide a deviation signal. The deviation signal may comprise an indication that the towed-vehicle is out of position and a jackknife situation may occur. The monitoring device 132 may further provide a towed-vehicle low-battery power signal. The deviation signal and the low-battery power signal may comprise at least one of a light, a sound, and an electrical signal. The monitoring device 132 may be a monitor screen 132, a speaker 132, a flashing light 132, or other device 132 suitable for issuing signals audibly and/or visually. The monitoring device 132 may receive a communication via a path 134. The path 134 may comprise a wire, a fiber optic cable, and/or a wireless transmission. The communication via path 134 may comprise a signal indicating that a towed-vehicle's battery power is low, that a jackknife condition may be occurring, or any other monitoring communication.

Figure 2:
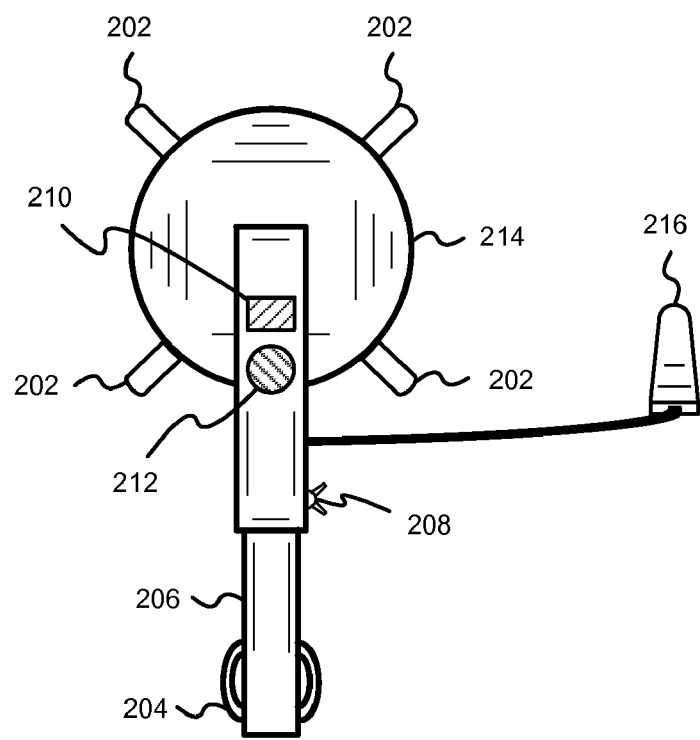
FIG. 2 is an illustration depicting one embodiment of a misalignment responder in accordance with the present invention.

FIG. 2 is an illustration depicting one embodiment of a misalignment responder 200 in accordance with the present invention. The misalignment responder 200 may comprise couplers 202 to attach the misalignment responder 200 to a steering wheel of the towed-vehicle. In one embodiment the couplers 202 may be three couplers 202. The couplers 202 may be configured as hooks 202, fasteners 202, clasps 202, or any coupling device 202 suitable for attachment to a steering wheel. The misalignment responder 200 may further comprise an anchor 204. In one embodiment the anchor 204 may anchor the misalignment responder 200 to a fastened seat belt in the driver compartment 130. The anchor 204 may be placed at the end of an extender 206. The extender 206 may be adjusted and/or secured using a catch mechanism 208. The adjustable extender 206 may allow for the misalignment responder 200 to fit a variety of driver compartments 130.

The misalignment responder 200 may comprise a receiver 210 configured to interpret the turn mode signal 126. In one embodiment the receiver 210 may be connected to the back up lights 112 of the towing-vehicle via a wire such that the misalignment responder 200 is engaged only when the towing-vehicle's back up lights 112 are on. In an alternate embodiment the receiver 210 may receive the back up signal 114 wirelessly. The receiver 210 may provide a misalignment responder activation signal to a rotary actuator 212 based on the back up signal 114 and the turn mode signal 126.

The turn mode signal 126 may further comprise an indication that a left turn or a right turn of the misalignment responder 200 may be required. The rotary actuator 212 may comprise an electric motor 212 rotating a worm gear (not shown). When a towing-vehicle is backing up the worm of the rotary actuator 212 gear may interface with a ring gear (not shown) of a steering wheel cover 214 such that when a turn mode signal 126 is received the worm gear rotates the ring gear turning the steering wheel. In one embodiment, the worm gear of the rotary actuator 212 may separate from the ring gear of the steering wheel cover 214 while the towing vehicle is moving forward allowing the free movement of the steering wheel of the towed-vehicle.

In alternate embodiments the steering wheel cover may comprise a belt, chain, or other device configured to provide mechanical advantage such that a turning of the steering wheel may be achieved by the activation of the rotary actuator 212. The electric motor 212 may further comprise a stall mode that shuts off the motor when a resistance force threshold is exceeded. The misalignment responder 200 may further comprise a power cord 216 that, in one embodiment, connects with an accessory power port in the towed-vehicle. In an alternate embodiment the power cord 216 may comprise a power supply from the towing-vehicle.

Figure 3:
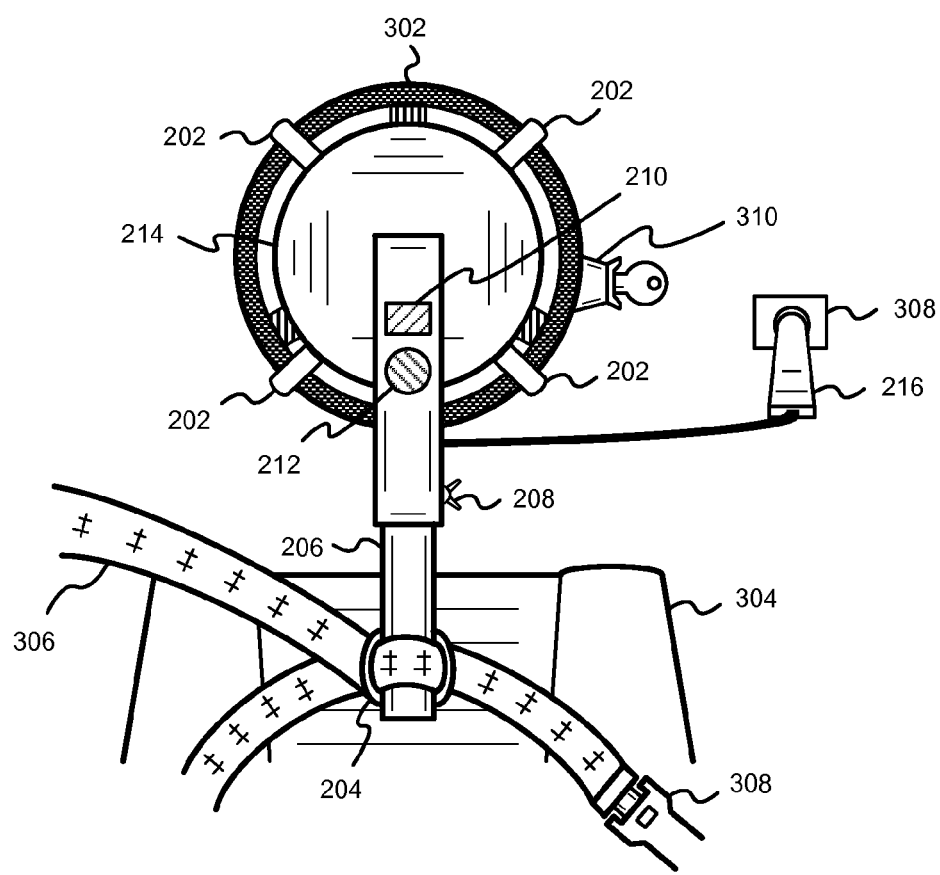
FIG. 3 is an illustration depicting one embodiment of a driver compartment in accordance with the present invention.

FIG. 3 is an illustration depicting one embodiment of a driver compartment 130 in accordance with the present invention. The driver compartment 130 comprises the misalignment responder 200 coupled to the steering wheel 302 by the couplers 202. The misalignment responder 200 is adjusted to fit in a seat 304 by the extender 206, and anchored to the seat belt 306 by the anchor 204. The seat belt 306 is tethered through the anchor 204 such that a rotation of the rotary actuator 212 left or right leverages against a stationary end of the seat belt 306. The seat belt 306 is held in the seat belt fastener 308. In one embodiment the power cord 216 may connect to an accessory power port 308. Prior to towing, the steering wheel lock is released by turning the ignition switch 310 to the accessory position.

Figure 4:
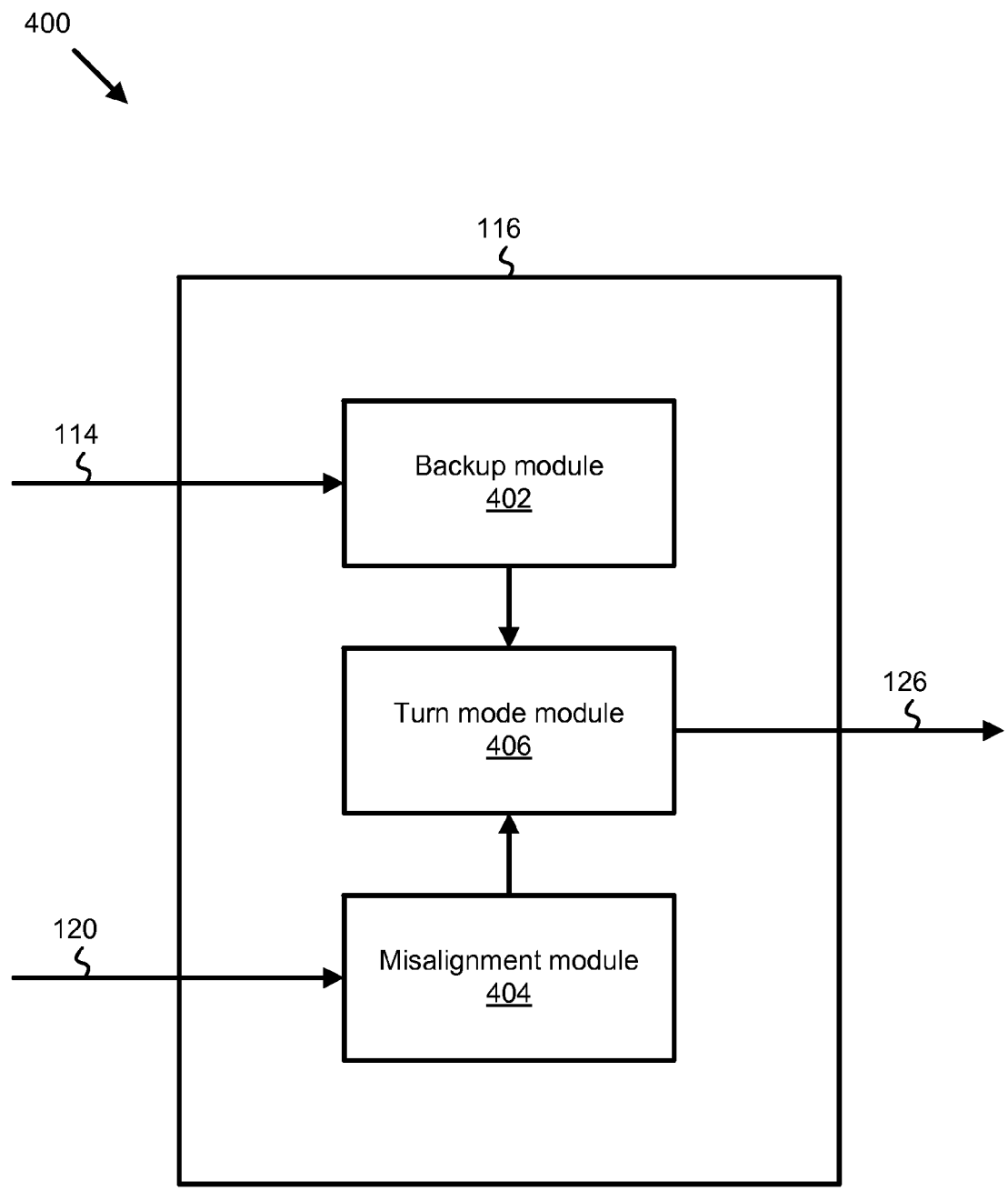
FIG. 4 is a schematic block diagram depicting one embodiment of a controller in accordance with the present invention.

FIG. 4 is a schematic block diagram illustrating one embodiment of a controller 116 in accordance with the present invention. In one embodiment the controller 116 may comprise a back up module 402 configured to interpret the back up signal 114. The back up signal 114 may comprise an indication that the back up lights 112 of the towing-vehicle are on, and/or that the towing vehicle's reverse gear is engaged. The back up signal 114 may also be received from a data network of the towing-vehicle indicating that the towing-vehicle is in the reverse gear. In an alternate embodiment the back up signal 114 is provided directly to the misalignment responder 200 permitting the misalignment responder 200 to engage while the towing-vehicle is backing up.

The controller 116 may comprise a misalignment module 404 configure to interpret the misalignment signal 120. In one embodiment the misalignment signal 120 may comprise ultrasonic measurements of distances 122A and 122B between the towing-vehicle's rear bumper and the towed-vehicle's front bumper such that the misalignment angle 124 may be calculated. In one embodiment the misalignment signal 120 may be provided to the receiver 210. For example, in an embodiment using two reed switches, when one of the reed switches is activated by a pivoting magnet passing over the reed switch as the towed-vehicle reaches a misalignment angle 124 a misalignment signal may be sent to the receiver 210 indicating that a turn of the towed-vehicle's steering wheel 302 is required.

The controller 116 may further comprise a turn mode module 406 configured to generate the turn mode signal 126 based on the back up signal 114 and the misalignment signal 120. In one embodiment the turn mode signal 126 may be transmitted to the receiver 210 via the wireless transmitter 128. In an alternate embodiment the signal may be transmitted over a wire connect to the receiver 210 of the towed-vehicle.

Figure 5:
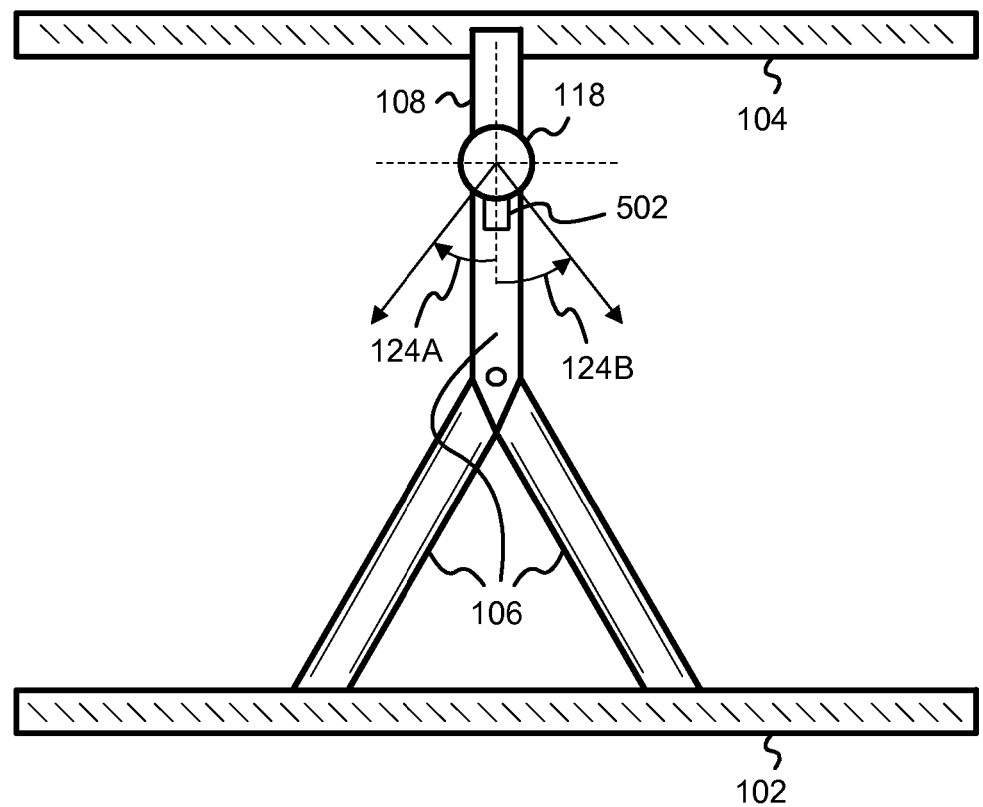
FIG. 5 is an illustration depicting an alternate embodiment of a misalignment detector in accordance with the present invention.

FIG. 5 is an illustration depicting an alternate embodiment of a misalignment detector 118 in accordance with the present invention. In the depicted embodiment the misalignment detector 118 may comprise two reed switches (not shown) placed on or within the misalignment detector 118. A magnet 502 may be placed on the tow bar 106 such that when the tow bar 106 pivots and the angle threshold 124A or 124B is achieved the reed switch passes under the magnet 502 activating the switch. In an alternate embodiment the misalignment detector 118 may be placed under the tow ball (not shown) with the magnet 502 passing over the misalignment detector 118.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
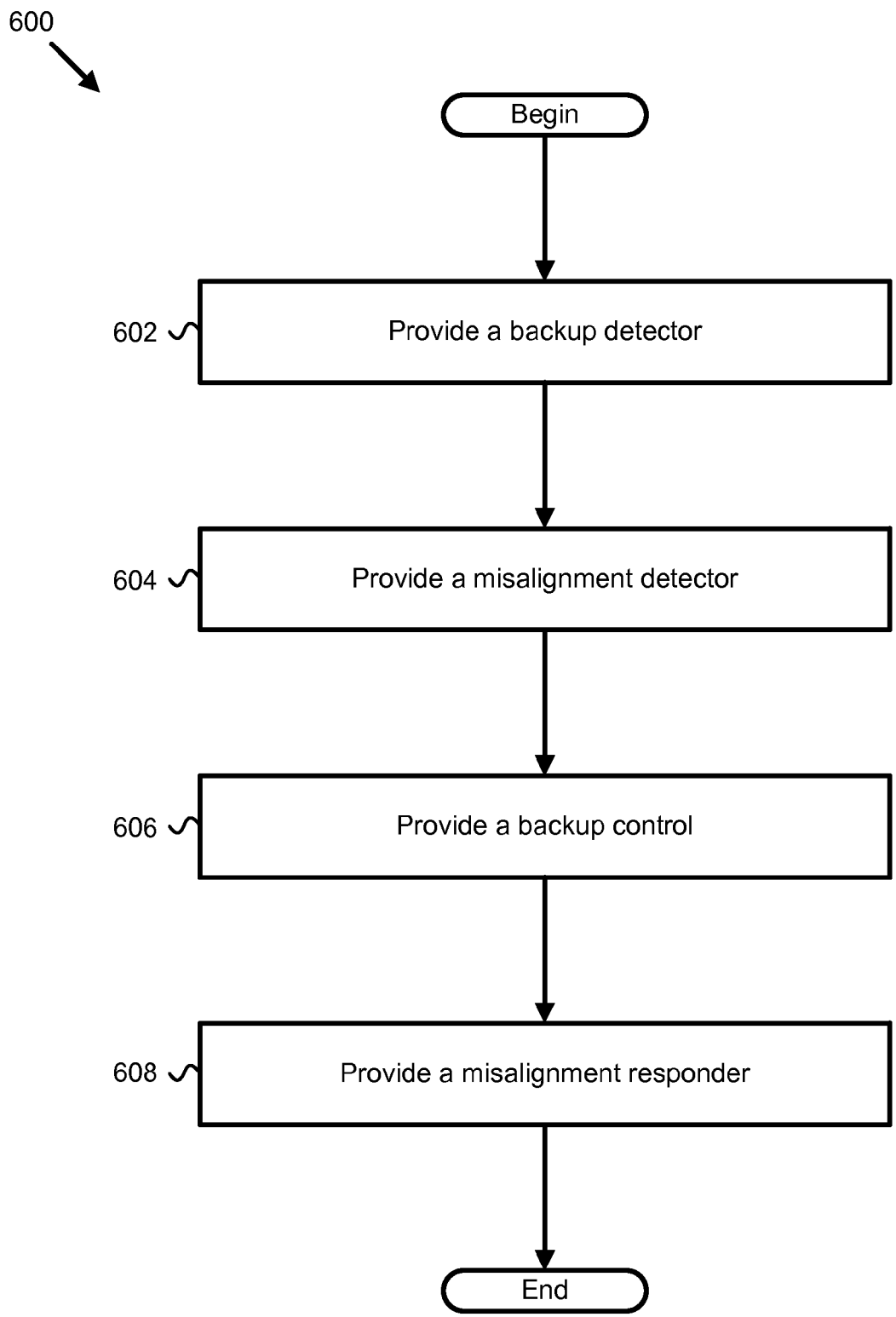
FIG. 6 is a schematic flow chart diagram illustrating one embodiment of a method for back up control of a towed-vehicle in accordance with the present invention.

FIG. 6 is a schematic flow chart diagram illustrating one embodiment of a method 600 for back up control of a towed-vehicle in accordance with the present invention. The method 600 comprises providing 602 a back up detector 112 that generates a back up signal 114 indicating that a towing-vehicle is backing up, and providing 604 a misalignment detector 118 that generates a misalignment signal 122 indicating that a towed-vehicle is misaligned. The method 600 further comprises providing 606 a controller 116 that generates a turn mode signal 126 based on the back up signal 114 and the misalignment signal 120. In one embodiment the back up signal 114 may provide an indication to the rotary actuator 212 to mechanically engage with the ring gear of the steering wheel cover 214 of the towed-vehicle. When the back up signal 114 is no longer provided the worm gear of the rotary actuator 212 may mechanically disengage from the ring gear of the steering wheel cover 214. The method concludes by providing 608 a misalignment responder 200 that turns the steering wheel 302 of the towed-vehicle based on the turn mode signal 126.

Figure 7:
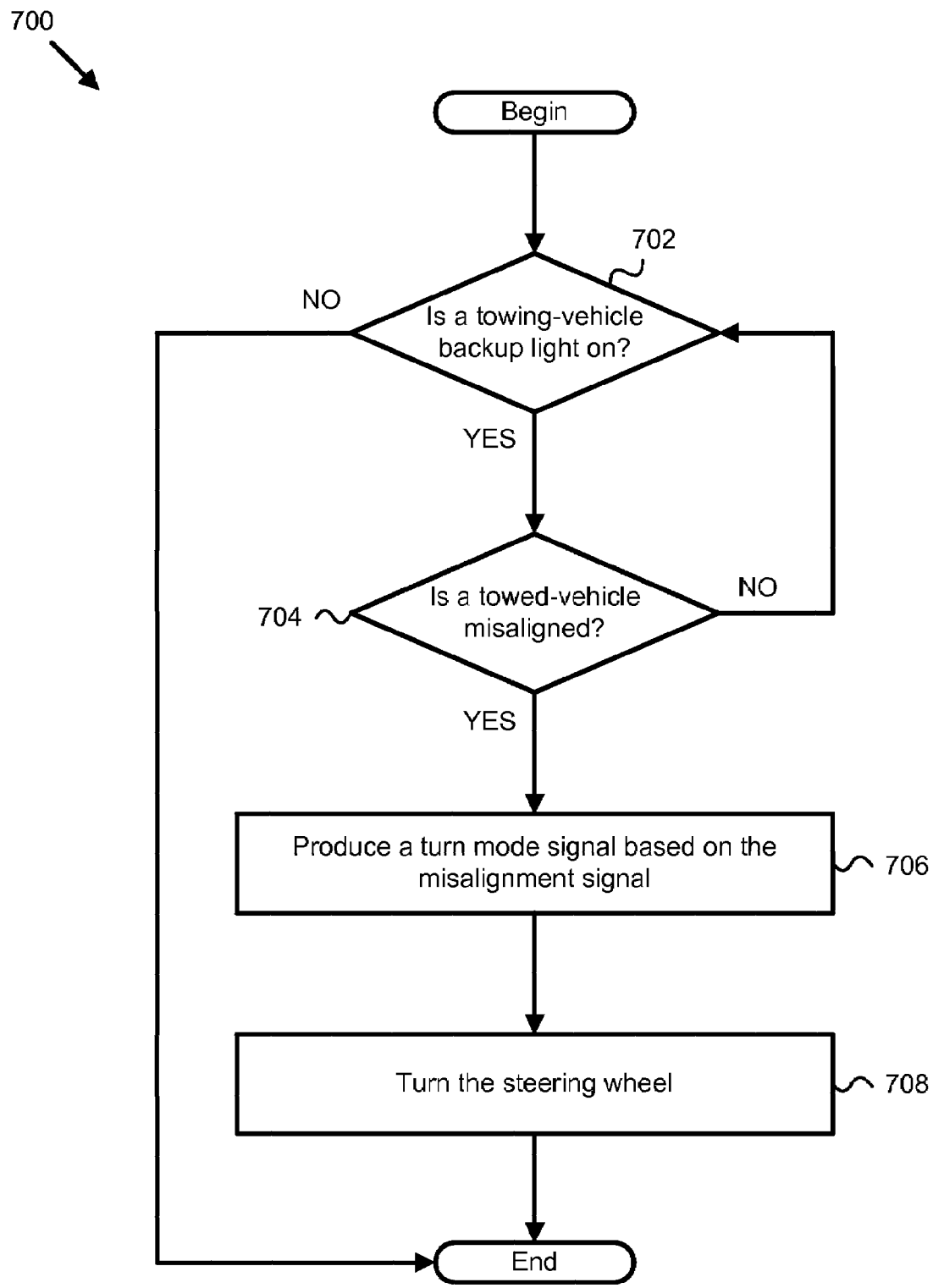
FIG. 7 is a schematic flow chart diagram illustrating one embodiment of an operation for back up control of a towed-vehicle in accordance with the present invention.

FIG. 7 is a schematic flow chart diagram illustrating one embodiment of an operation 700 for back up control of a towed-vehicle in accordance with the present invention. The operation 700 begins by the controller 116 interpreting 702 a back up signal 114 indicating that a towing-vehicle is backing up. In one embodiment, determining that a towing-vehicle is backing up comprises determining that a towing-vehicle's back up lights 112 are on. The operation 700 continues by the controller 116 interpreting 704 a misalignment signal 120 and the controller 116 producing a turn mode signal 126 based on the misalignment signal 120. The operation 700 concludes by the misalignment responder 200 turning the steering wheel 302 based on the turn mode signal 126.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for back up control of a towed-vehicle, the method comprising:
providing a back up detector that generates a back up signal indicating that a towing-vehicle is backing up;
providing a misalignment detector that generates a misalignment signal indicating that a towed-vehicle is misaligned;
providing a controller that generates a turn mode signal based on the back up signal and the misalignment signal; and
providing a misalignment responder that turns a steering wheel in response to the turn mode signal.

2. The method of claim 1, wherein providing a back up detector comprises providing a wire electrically coupled to the towing vehicle's back up lights.

3. The method of claim 1, wherein providing a misalignment detector comprises providing at least one device selected from the group consisting of a magnetic sensor, an electromagnetic field sensor, an infrared sensor, an optical sensor, an ultrasonic sensor, and a mechanical switch.

4. The method of claim 1, further comprising providing a monitoring device to indicate that the towed-vehicle's battery power is low.

5. The method of claim 1, further comprising providing a monitoring device to indicate that the towed-vehicle and a towing-vehicle are misaligned.

6. The method of claim 1, wherein a misalignment responder comprises an extendable stabilizer, at least three couplers, an attachable anchor, a power connector, a receiver, and a rotary actuator.

7. The method of claim 6, wherein the attachable anchor is coupled to a seat belt.

8. The method of claim 6, wherein the power connector interfaces with an accessory power port of the towed-vehicle.

9. A signal bearing medium tangibly embodying a program of machine-readable instructions executable by a digital processing apparatus to perform an operation to control back up of a towed-vehicle, the operation comprising:
 interpreting a back up signal indicating that a towing-vehicle is backing up;
 interpreting a misalignment signal indicating that a towed-vehicle is misaligned; and
 producing a turn mode signal indicating a direction to turn the steering wheel of the towed-vehicle in response to the back up signal and the misalignment signal.

10. The operation of claim 9, wherein interpreting a back up signal comprises one of interpreting a signal indicating that a towed-vehicle's back up lights are on, interpreting a signal from a data network indicating that towing-vehicle is in a reverse gear, and interpreting a user input from a switch.

11. The operation of claim 9, wherein interpreting a misalignment signal comprises one of interpreting a signal from a magnetic reed switch, interpreting a signal from a mechanical switch, and interpreting at least one position signal from an ultrasonic sensor.

12. The operation of claim 9, wherein producing the turn mode signal comprises determining whether a relative angle between the towing-vehicle and the towed-vehicle is exceeding a relative angle threshold, and determining a direction to turn the towed-vehicle's wheels based on the direction of the exceeded relative angle threshold.

13. The operation of claim 12, wherein the relative angle comprises an angle formed by an absolute deviation from parallel of an axis along the length of the towed-vehicle compared to an axis along the length of the towing-vehicle, the relative angle threshold of the absolute deviation being about 25 to 35 degrees.

14. A system for back up control of a towed-vehicle, the system comprising:
 a back up detector producing a back up signal indicating that a towing-vehicle is backing up;
 at least one misalignment sensor producing a misalignment signal indicating that a towed-vehicle is misaligned;
 a controller interpreting the back up signal and the misalignment signal, the controller producing a turn mode signal in response to the back up signal and the misalignment signal; and
 a misalignment responder coupled to the steering wheel of a towed-vehicle, the misalignment responder turning the steering wheel in response to the turn mode signal.

15. The system of claim 14, wherein the at least one misalignment sensor includes at least one sensor selected from the group consisting of a magnetic sensor, an electromagnetic field sensor, an infrared sensor, an optical sensor, an ultrasonic sensor, and a mechanical switch.

16. The system of claim 14, wherein the system further comprises a wireless transmitter that receives the turn mode signal, the wireless transmitter transmitting the turn mode signal to the misalignment responder.

17. The system of claim 14, wherein the misalignment signal is produced when a relative angle exceeds a relative angle threshold, the relative angle formed by an absolute deviation from parallel of an axis along the length of the towed-vehicle compared to an axis along the length of the towing-vehicle, the relative angle threshold of the absolute deviation being about 25 to 35 degrees.

18. The system of claim 14, wherein the back up detector comprises one of a wire electronically coupled to a towing vehicle's back up lights and an indication that a towing-vehicle's reverse gear is engaged.

19. The system of claim 14, wherein the misalignment responder receives power from at least one of a power source consisting of a power socket of the towed-vehicle, a 12-volt power supply of the towed-vehicle, a 24-volt power supply of the towed-vehicle, a 42-volt power supply of the towed-vehicle, a 12-volt power supply of the towing-vehicle, a 24-volt power supply of the towing-vehicle, and a 42-volt power supply of a towing-vehicle.

20. The system of claim 14, wherein the misalignment responder comprises an extendable stabilizer stabilizing the misalignment responder on the driver's seat of the towed-vehicle, the misalignment responder further anchored to a fixture in the proximity of the steering wheel.

21. The system of claim 14, wherein the misalignment responder comprises a receiver transferring signals from the controller to the misalignment responder, a rotary actuator turning a steering wheel based on the back up signal and the turn mode signal, the rotary actuator further turning off when a stall of the rotary actuator is detected.

22. The system of claim 21, wherein the rotary actuator turns a worm gear mechanically transferring rotational energy to a ring gear coupled to the towed-vehicle's steering wheel.

23. The system of claim 22, wherein the worm gear mechanically engages the ring gear when the towing-vehicle is in a reverse gear, and mechanically disengages the ring gear when the towing-vehicle is not in a reverse gear.

24. The system of claim 21, wherein the rotary actuator turns one of a device consisting of a belt drive, a chain drive, and a gear mechanism.

25. The system of claim 14, further comprising a monitoring device providing a deviation signal, the signal comprising at least one of a light, a sound, and an electrical signal.

26. The system of claim 14, further comprising the monitoring device providing a towed-vehicle low-battery power signal, the signal comprising at least one of a light, a sound, and an electrical signal.

* * * * *